United States Patent
Cook

[15] 3,656,796
[45] Apr. 18, 1972

[54] CARGO SLING
[72] Inventor: Lionel H. J. Cook, Vancouver, British Columbia, Canada
[73] Assignee: Okanagan Helicopters Ltd., Vancouver, British Columbia, Canada
[22] Filed: July 13, 1970
[21] Appl. No.: 64,004

Related U.S. Application Data
[63] Continuation of Ser. No. 737,782, June 17, 1968, abandoned.

[30] Foreign Application Priority Data
Aug. 24, 1967 Canada...................................998 610

[52] U.S. Cl. ................................294/78 R, 294/74, 294/87
[51] Int. Cl. .........................................................B66c 1/34
[58] Field of Search........................294/78, 81, 81 SF, 74, 75, 294/82 AN, 87, 78, 66

[56] References Cited

UNITED STATES PATENTS

| | | | |
|---|---|---|---|
| 1,060,696 | 5/1913 | Naucler | 294/81 |
| 994,668 | 7/1911 | Sevin and Roussel | 294/75 |
| 3,341,244 | 9/1967 | Johnson | 294/75 |

Primary Examiner—Richard E. Aegerter
Assistant Examiner—Douglas D. Watts
Attorney—Cushman, Darby & Cushman

[57] ABSTRACT

A cargo sling which maintains stability on releasing any one of a number of loads being carried thereby. The sling is releasably connected to a supporting structure for releasing the loads collectively, and includes a supporting ring or equivalent thereof for supporting a plurality of cargo hooks. Each hook is preferably operable automatically, and is connected substantially unyieldingly to the supporting structure by means of an interconnected plurality of suspension arms and a corresponding plurality of sling arms. Such arms are completely interchangeable and, under load, assume a conical configuration wherein the centre of gravity is located so as to assure stability of the load during any vertical, transverse or translational motion of the cargo sling and load. The cargo sling is particularly adapted for use with helicopters.

2 Claims, 6 Drawing Figures

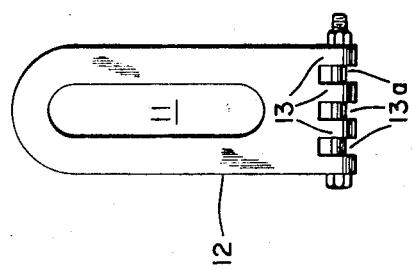
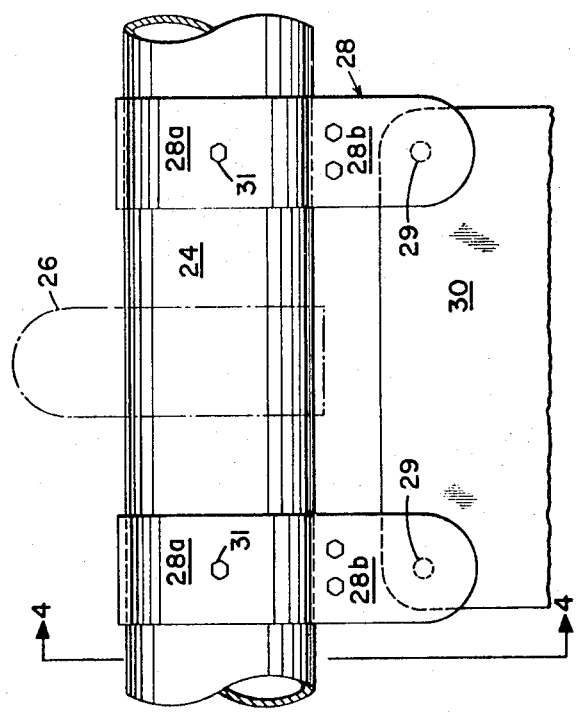
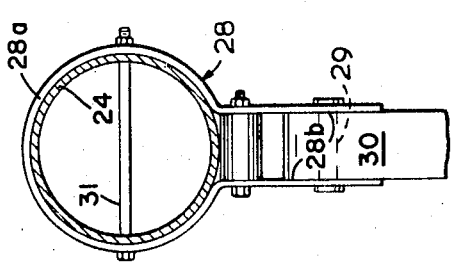

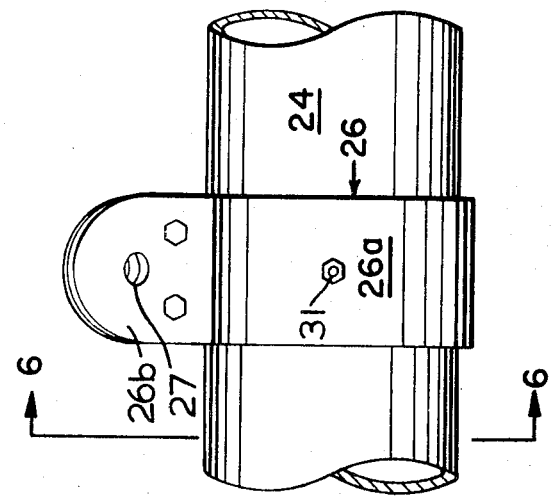
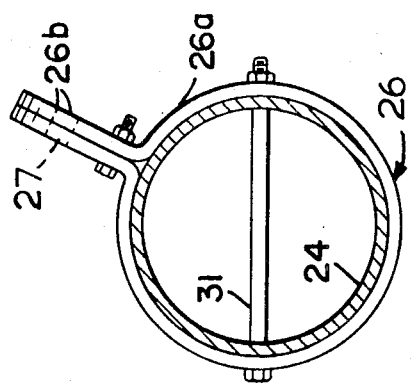

CARGO SLING

This is a continuation of my previously filed application serial number 737,782, filed June 17, 1968, now abandoned.

This invention relates generally to a cargo sling which is adapted to be carried in suspension from a supporting member. Specifically, the present invention provides for a cargo sling which may be carried by a cargo hook mounted on an overhead crane, a boom assembly, and in particular, as adapted to be mounted on an aircraft fuselage.

A common problem encountered when a load or plurality of loads is carried by a cargo sling, is that of maintaining stability following the release of one of such loads. It will be evident, of course, that the need for maintaining proper stability upon the release of a load is particularly acute when the load is carried from the fuselage of a helicopter, or similar type of hovering aircraft. It will be even more evident that the problem of maintaining stability as between the cargo sling and the helicopter carrying such a sling, is particularly important under those conditions where a number of loads (identical, or otherwise) are being carried simultaneously, but are to be released separately. Such loads might be in the form of a number of fuel drums, or other types of pre-packaged or self-contained supply caches.

Inasmuch as cargo slings are to be used to transport loads of the type described above by air into remote areas which are often otherwise inaccessible, it is desirable to be able to release either a selected one of a plurality of individual loads being carried by the cargo sling, or the entire cargo sling with all of the loads.

It is, accordingly, an object of the present invention to provide a cargo sling which has improved characteristics of stability upon release of a load therefrom.

It is another object of the present invention to provide a cargo sling whereby a plurality of loads may be carried, such loads to be released either individually or collectively.

These and other objects and features of the present invention may be found in a cargo sling which is adapted to be suspended from a supporting member for carrying a load or a plurality of loads, said cargo sling comprising; one support frame in the form of a closed loop that is adapted to carry a plurality of cargo hooks thereon, each cargo hook having a minimum rated capacity at least equal to its particular load; a plurality of sling arms each of substantially the same length and each having one end thereof attached to the support frame; and a plurality of suspension cable means one end of each cable means being attachable to said supporting member, with the other end of each of the cable means being attached to the other end of associated ones of the sling arms. Preferably, the sling arms will be releasably attached to the support frame at points which are spaced equidistant apart along the closed loop. Moreover, each of the sling arms is preferably identical in construction, and each of the suspension cable means is preferably identical in construction.

In a particular embodiment of this invention, the present cargo sling is adapted to be suspended from the fuselage of a helicopter. Preferably, the suspension cable means are connected to a swiveling bridle which is itself releasably attachable to the helicopter fuselage. In yet another preferred embodiment, the present invention provides a cargo sling as above described, utilizing therewith a cargo hook assembly of the type disclosed in our co-pending patent application, filed concurrently herewith and having the Ser. No. 737,783.

With reference to the drawings which illustrate a preferred embodiment of the present invention;

FIG. 2 is an elevation view showing one form of a support bridle which may be used to support the cargo sling from the helicopter;

FIG. 3 is an elevation view showing how a cargo hook is attached to the loop-like support means of the cargo sling;

FIG. 4 is an elevation view, partly in section, taken along line 4—4 of FIG. 3;

FIG. 5 is an elevation view showing how one of the sling arms is connected to the support ring of the cargo sling;

FIG. 6 is an elevation view, partly in section, taken along line 6—6 of FIG. 5.

Figure 1:
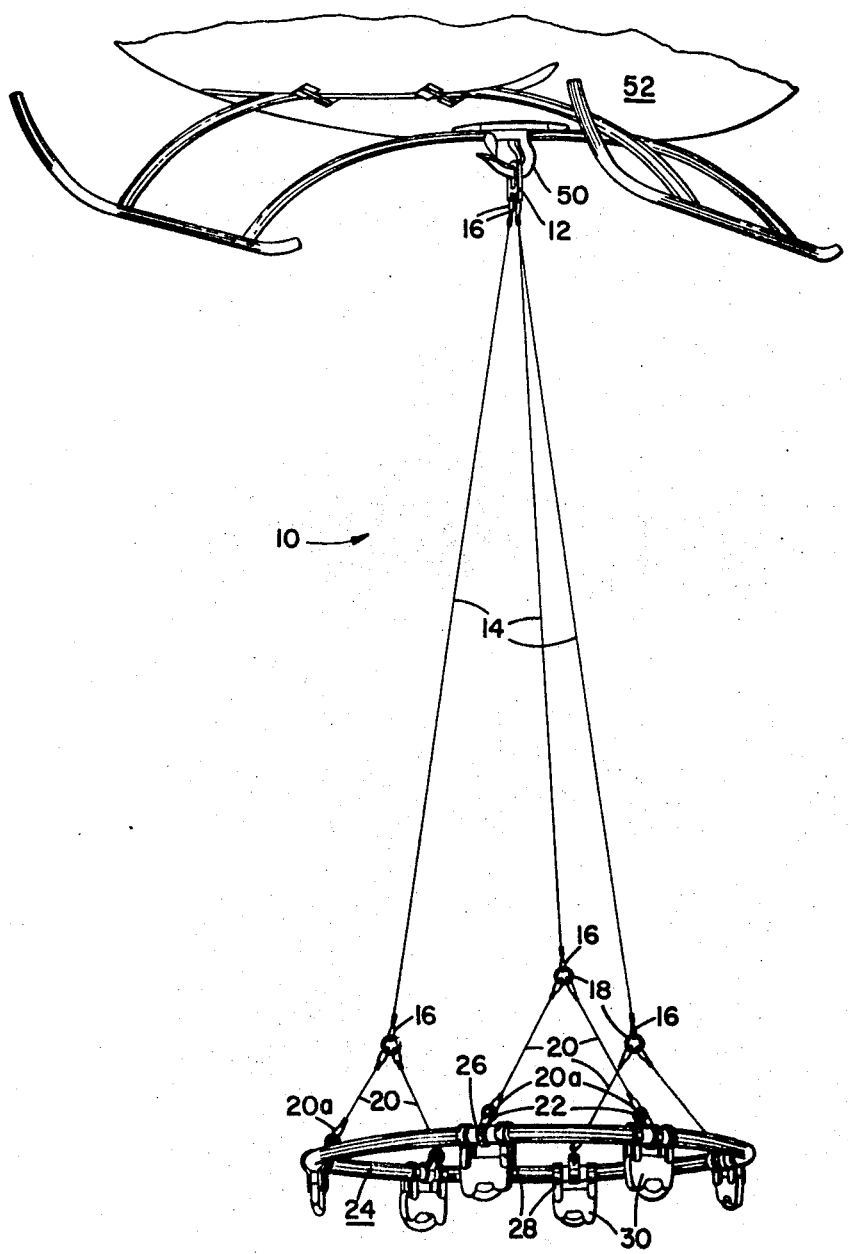
FIG. 1 is an elevation view, showing pictorially a cargo sling being suspended from the fuselage of a helicopter.

FIG. 1 shows a cargo sling 10 suspended by means of a support bridle 12 from a cargo hook 50 conventionally supported on the underside of a fuselage 52 of a helicopter. The cargo hook 50 may be on any known construction, but preferably is an automatically releasing type of cargo hook. That is, the cargo hook 50 may be actuated remotely to release its load. Furthermore, the cargo hook 50 may be specifically of the type shown and disclosed in our co-pending patent application mentioned above. Further yet, the cargo hook 50 will normally be pivotally or otherwise movably connected to the fuselage 52 of the helicopter, in order to provide for some degree of relative motion therebetween. However, it is not intended that the cargo hook 50 be limited to such a construction.

A plurality of suspension means shown here in the form of suspension cables 14 are provided with closed loops 16 suitable formed at either end of the suspension cables, such loops 16 facilitating the attachment of the suspension cables 14 to the support bridle 12. See FIG. 2. The support bridle 12 is provided with an elongated slot 11, through which the hook member of the cargo hook 50 extends to support the bridle. At the end of the support bridle 12, remote from the slot 11, there is provided a plurality of extensions 13 which define a corresponding plurality of slots 13a. Each of the extensions 13 has a bore hole extending transversely therethrough, for receiving bolt means or similar fastening means used to connect the suspension cables 14 to the support bridle 12.

Each of the loops 16 has a shackle 18 connected thereto at the end of each of the suspension cables 14 remote from the support bridle 12, for detachably connecting the sling arms 20 to the suspension cables 14. Alternative and equivalent structure could also be used instead of the shackles 18. Each of the sling arms 20 is provided at each end thereof with closed loops 20a, substantially similar in construction to the loops 16 of the suspension cables 14. A second set of shackles 22, substantially identical to the shackles 18, are provided to detachably connect the sling arms 20 to a generally circular support ring 24 in the form of a closed loop. Although the support ring 24 is shown to be substantially circular both in cross-section, and in plan view, it may of course be of other equivalent form, such as a spoke-like arrangement.

Spaced along the length of the support ring 24 are a first plurality of ring supports 26, and mounted on the support ring 24 on either side of each such ring support 26, are a second plurality of hook supports 28. The rings supports 26 and the hook supports 28 are substantially identical in construction, differing only by the extent to which such support have been tightened by means of suitable fastening means, in the form of bolts or the like, when the supports have been connected to the support ring 24. See FIGS. 4 and 6. Each of the supports 26 and 28 is in the form of an elongated plate, which has been formed by bending or the like to a loop portion 26a, and 28a, respectively, and tongue portions 26b and 28b, respectively. Each of the tongue portions 26b and 28b is provided with a bore hole 27 and 29, respectively, for receiving fastening means connecting such supports either to the sling arms 20, or to each of a plurality of cargo hooks 30 of the cargo sling 10. FIGS. 4 and 6 show fastening means in the form of a bolt 31, for securing the rings supports 26 and the hook supports 28, suitably apertured, to the support ring 24 to prevent any relative motion therebetween. In addition, the tongue sections 26b and 28b of the ring supports 26 and the hook supports 28 are also provided with suitable fastening means in the form of bolts or the like, for tightening together of the respective tongue sections of such supports, for clamping the same to the support ring 24.

It is to be noted that in the embodiment described herein, the ring supports 26 and hook supports 28 are spaced apart substantially by an equal distance, for providing better distribution of the weight of any load being carried by the cargo hooks 30. In addition, it will be noted from FIG. 3 that each of the ring supports 26 is positioned approximately mid-way between a corresponding pair of hook supports 28, the latter supporting the cargo hook 30. It can, therefore, be seen from FIG. 1 that the cargo sling 10 may carry a number of loads, each of which is supported substantially unyieldingly from the cargo hook 50 on the helicopter 52. In other words, the suspension cables 14, and the sling arm 20 and the support ring 24 are so interconnected as to be essentially unaffected with respect to stability by the release of a selected one of the loads from a cargo hook 30. As in the case of the cargo hook 50, the cargo hooks 30 mounted on the support ring 24, may be of any known construction. However, the type of cargo hook disclosed in our above-mentioned co-pending patent application is particularly well suited for use with the present cargo sling 10. It should be noted, of course, that the cargo hooks 50 and 30 may be electrically operated, in which case conductor means must be provided to effect electrical interconnection between an electrical power supply being carried by the helicopter, and the cargo hooks 30 being carried by the support ring 24. Such electrical conductor means will include quick release connections, for providing rapid disconnection of the electrical circuitry in the event that the entire cargo sling 10 and its load, is to be simultaneously dropped by releasing the cargo hook 50.

In general terms, each of the suspension cables 14, as well as each of the sling arms 20, will be manufactured from a material whose strength properties are compatible with the weight of load being contemplated for transport using the cargo sling 10. However, each of the suspension cables 14, as well as each of the sling arms 20 will, in fact, be constructed to incorporate safety factors therein, which, in effect, will result in a considerable overload capability being built into the cargo sling 10.

From the symmetrical arrangement employed in constructing the cargo sling 10 shown herein, it can be seen that positioning of the support ring 24 will always be maintained in a generally horizontal attitude, irrespective of which one, or several, of the plurality of cargo hooks 30 is carrying a load. In addition, it may be seen that following the pick-up of the loads by each of the cargo hooks 30, that any one of such loads may be released individually, without affecting the stability of the cargo sling 10. This feature is particularly important since the cargo sling 10 is supported from a helicopter, which, as it hovers over a location where a load is to be released or set down, will be inherently unstable to a certain degree. That is to say, the helicopter is unstable itself to a certain degree, and, therefore, it is highly desirable that releasing of one or more of the loads either simultaneously or separately, should not further contribute to the relative instability of the helicopter. Accordingly, the cargo sling 10 as it is supported by the cargo hook 50 on the helicopter, will, in fact, be substantially stable, being unaffected by the manner in which the loads are released from the cargo hooks 30.

It can also be seen from the description and drawings of the present cargo sling 10, that each of the suspension cables 14, as well as each of the sling arms 20, may be interchanged end for end without affecting the operation of the cargo sling. That is to say, any one of the suspension cables 14 may be interchanged with another of the suspension cables, and each of the cargo slings may be interchanged in a similar manner. Further yet, the structure of each of the ring supports 26 and each of the hook supports 28 are generally similar to the extent that such supports may also be interchanged, or substituted one for the other, if it is so required.

Although it has not been shown in FIG. 1 of the present drawings, the cargo hook 50 is usually connected to the fuselage 52 of the helicopter by means of a swivel joint. Such a swivel joint is desirable in order to prevent entanglement or twisting of the cables due to aerodynamic forces on the loads being carried. If desired, the swivel joint may be an inherent part of the main cargo hook connected to the aircraft's fuselage, or alternatively, it may be separate from the main cargo hook. In addition, the swivel joint is designed to carry the same full load as carried by the cargo hook. The swivel joint is completely sealed and electrical contacts in the form of copper strips are mounted within the swivel joint. The copper strips are mounted in a fixed, two part block within the swivel joint in order to maintain continuity of an electrical path in the event of possible failure of either copper strip. Preventing twisting or tangling of the cables of the cargo sling is desirable since the cables could wind up, in the absence of a swivel joint, to such an extent that the eye of the cable will be jammed against the body of the cargo hook and stop releasing of the load.

I claim:

1. A cargo sling adapted to be suspended from a supporting member, such as an airborne vehicle fuselage, for carrying at least one load, said cargo sling comprising:

a support frame in the form of a unitary closed loop disposed generally horizontally;

a plurality of cargo hooks mounted on said support frame at angularly spaced sites;

a plurality of sling arms, each having two ends and all of said sling arms being of substantially the same length, the number of sling arms equalling the number of cargo hooks;

a plurality of suspension cables, each having two ends and all of said suspension cables being of substantially the same length;

a plurality of shackles equalling in number the number of said suspension cables;

a bridle having means thereon for securing the bridle to the supporting member;

means securing one upper end of each suspension cable to said bridle;

means securing the opposite, lower end of each suspension cable to a respective one shackle of said plurality of shackles;

means securing each one upper end of each sling arm to a respective one shackle of said plurality of shackles in an evenly distributed fashion such that each said shackle has an equal number of sling arm one upper ends secured thereto;

means securing the opposite, lower end of each sling arm to said unitary, closed loop, support frame at a respective one of said sites, whereby said sling arms are connected to said support frame at all said angularly spaced sites;

said suspension cables and said sling arms being of fixed length and plurality of cargo hooks being constructed for operation independently of one another and independently of said suspension cables and said sling arms for grasping and releasing loads.

2. The cargo sling of claim 1 wherein:

each sling arm is constituted by a cable having means defining a closed loop at each end thereof for constituting the two recited securing means thereof;

each suspension cable is constitued by a cable having means defining a closed loop at each end thereof for constituting the two recited securing means thereof; and there are at least twice as many sling arms as there are suspension cables.

* * * * *